US008027587B1

(12) United States Patent
Watts

(10) Patent No.: US 8,027,587 B1
(45) Date of Patent: Sep. 27, 2011

(54) INTEGRATED OPTIC VECTOR-MATRIX MULTIPLIER

(75) Inventor: Michael R. Watts, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 635 days.

(21) Appl. No.: 12/194,646

(22) Filed: Aug. 20, 2008

Related U.S. Application Data

(60) Provisional application No. 60/956,968, filed on Aug. 21, 2007.

(51) Int. Cl.
*H04J 14/02* (2006.01)

(52) U.S. Cl. ............ 398/79; 398/48; 398/183; 398/186; 385/24; 385/2; 385/32; 385/50; 359/107; 359/237; 708/831; 708/191; 364/845; 364/841

(58) Field of Classification Search .................... 398/48, 398/79, 183, 83, 43, 82, 85, 141, 186, 200, 398/201; 385/24, 37, 16, 17, 18, 2, 32, 50; 359/107, 237, 245, 238, 561; 708/831, 191, 708/607; 364/736, 713, 754, 845, 841, 757
See application file for complete search history.

(56) References Cited

U.S. PATENT DOCUMENTS 3,944,820 A 3/1976 Stotts
4,937,776 A 6/1990 Myers et al.
5,448,749 A * 9/1995 Kyuma et al. ................. 700/286
6,894,827 B2 5/2005 Mendlovic et al.
7,536,431 B2 * 5/2009 Goren et al. .................. 708/831
2004/0243657 A1 12/2004 Goren et al.

OTHER PUBLICATIONS

J. W. Goodman, et al, "Fully parallel, high-speed incoherent optical method for performing discrete Fourier transforms", Optical Society of America, Optics Letters, vol. 2, No. 1, Jan. 1978, pp. 1-3.
Matthias Gruber, et al, "Planar-integrated optical vector-matrix multiplier", Applied Optics, vol. 39, No. 29, Oct. 10, 2000, pp. 5367-5373.
Milos A. Popovic, et al, "Multistage high-order microring-resonator add-drop filters", Optical Society of America, Optics Letters, vol. 31, No. 17, Sep. 1, 2006, pp. 2571-2573.
Qianfan Xu, et al, "Micrometre-scale silicon electro-optic modulator", Nature Publishing Group, Letters, vol. 435, No. 19, 2005, pp. 325-327 .

* cited by examiner

*Primary Examiner* — Hanh Phan
(74) *Attorney, Agent, or Firm* — John Hohimer

(57) ABSTRACT

A vector-matrix multiplier is disclosed which uses N different wavelengths of light that are modulated with amplitudes representing elements of an N×1 vector and combined to form an input wavelength-division multiplexed (WDM) light stream. The input WDM light stream is split into N streamlets from which each wavelength of the light is individually coupled out and modulated for a second time using an input signal representing elements of an M×N matrix, and is then coupled into an output waveguide for each streamlet to form an output WDM light stream which is detected to generate a product of the vector and matrix. The vector-matrix multiplier can be formed as an integrated optical circuit using either waveguide amplitude modulators or ring resonator amplitude modulators.

28 Claims, 8 Drawing Sheets

$$C = A \times B$$

$$\begin{bmatrix} c_1 \\ c_2 \\ \vdots \\ c_M \end{bmatrix} = \begin{bmatrix} a_1 \\ a_2 \\ \vdots \\ a_N \end{bmatrix} \begin{bmatrix} b_{11} & b_{12} & \cdots & b_{1N} \\ b_{21} & b_{22} & \cdots & b_{2N} \\ \vdots & \vdots & & \vdots \\ b_{M1} & b_{M2} & \cdots & b_{MN} \end{bmatrix}$$

FIG. 2

Section 1 - 1

Section 2 - 2

Section 3 - 3

INTEGRATED OPTIC VECTOR-MATRIX MULTIPLIER

CROSS REFERENCE TO RELATED APPLICATIONS

The present application hereby claims the benefit of previously filed U.S. provisional patent application Ser. No. 60/956,968, entitled "Integrated Optic Vector-Matrix Multiplier," filed on Aug. 21, 2007, the contents of which are incorporated herein by reference in their entirety.

The present application is also related to U.S. patent application Ser. No. 12/100,004, entitled "Wavelength Tunable Optical Ring Resonators," of common assignee filed on Apr. 9, 2008, the contents of which are incorporated herein by reference in their entirety.

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to integrated optical circuits (also termed photonic integrated circuits), and in particular to integrated optical circuits which can perform a vector-matrix multiplication.

BACKGROUND OF THE INVENTION

Vector-matrix multiply operations are highly computationally intensive and are needed for such applications as eigenmode calculations and decoding algorithms. The ability to perform vector-matrix multiplication at a high rate of speed is also needed for many computationally intensive applications including synthetic aperture radar and image processing (both 2D and 3D). Traditional digital computers and even vectorizing machines are limited in their ability to perform such computations at high rates of speed. Current state-of-the-art digital computers can achieve about ten billion ($10^{10}$) floating point operations per second. Despite this seemingly high rate of computation, codes for electromagnetic and quantum systems, for example, often require highly parallel digital computers, which are quite large and power intensive, to run for days at a time to achieve a result. This is insufficient for many applications which require real time data processing.

Over the past few decades, different types of optical vector-matrix multipliers have been proposed as a way of speeding up vector-matrix multiplication (see e.g. U.S. Pat. Nos. 3,944,820; 4,633,428; 4,937,776; 5,448,749; 6,894,827; and U.S. Patent Application Publication No. 2004/0243657). Most of these prior art approaches to vector-matrix multiplication are based on free-space optical signal processing approaches which suffer from a number of difficulties: (1) the resulting processors are cumbersome, (2) the manufacturing process is difficult to control, (3) exotic electro-optical materials are required to implement spatial light modulators (SLMs) required to encode matrix information, with the SLMs being relatively expensive and having a poor light transmission quality, (4) there is significant cross-talk and a poor signal quality, (5) it is difficult to uniformly illuminate the SLMs, and (6) there is generally an inefficient use of the available optical bandwidth. In the end, these prior art vector-matrix multipliers are large; they tend to have poor bit-error-rates; and they exhibit much lower performance than should be possible given the vast optical bandwidth that they utilize.

The present invention provides an integrated optic vector-matrix multiplier which utilizes wavelength-division-multiplexing (WDM) technology and semiconductor microfabrication to provide a compact device which can carefully allocate an available optical bandwidth while minimizing cross-talk.

The integrated optical vector-matrix multiplier of the present invention can also provide a precise representation of the vector and matrix elements, and can operate with electrical and optical inputs and outputs.

These and other advantages of the present invention will become evident to those skilled in the art.

SUMMARY OF THE INVENTION

The present invention relates to a vector-matrix multiplier for multiplying an N×1 vector and an M×N matrix to generate an M×1 vector-matrix product. The apparatus comprises an optical multiplexer to receive a plurality of N different wavelengths of light corresponding to a number N of rows in the vector and to combine the plurality of N different wavelengths of light into an input wavelength-division-multiplexed (WDM) light stream. Each different wavelength of light (also referred to herein as a channel of light) is modulated with an amplitude which represents a row element $a_i$ of the vector with i=1, 2 . . . N. An optical splitter receives the input WDM light stream from the optical multiplexer and splits the input WDM light stream into a plurality of M light streamlets, with each light streamlet being guided out of the optical splitter into a transfer waveguide. A plurality of M×N optical amplitude modulators are further provided in the apparatus and arranged in M rows, with each row containing N of the optical amplitude modulators, and with each optical amplitude modulator in each of the M rows being coupled to one of the transfer waveguides to receive one of the N different wavelengths of light from the light streamlet in that transfer waveguide and to amplitude modulate that wavelength of light for a second time in response to an input signal which represents a column element $b_{ji}$ of the matrix which is provided to that optical amplitude modulator. A plurality of M output waveguides are coupled to each optical amplitude modulator located in one of the M rows to receive each of the N different wavelengths of light from that row which have been amplitude-modulated for the second time and to form therefrom an output WDM light stream having an overall amplitude which represents a row element $c_j=\Sigma a_i b_{ji}$ of the M×1 vector-matrix product. The plurality of N different wavelengths of light can be generated by one or more lasers.

The apparatus can further comprise a plurality of photodetectors, with each photodetector detecting the overall amplitude of one of the output WDM light streams to generate therefrom an electrical output signal that represents one of the row elements $c_j$ of the M×1 vector-matrix product. The output signal corresponding to each row element $c_j$ of the M×1 vector-matrix product can be an analog output signal. The analog output signal can be converted into a digital output signal using an analog-to-digital (A/D) converter.

In certain embodiments of the present invention, both the row elements $a_i$ and the column elements $b_{ji}$ can be provided as digital elements, in which case, a plurality of digital-to-analog (D/A) converters can be provided in the apparatus to convert the row elements $a_i$ and the column elements $b_{ji}$ into analog elements. This is useful to provide an analog amplitude modulation for the plurality of N different wavelengths of light, and also for the plurality of M×N optical amplitude modulators.

The optical multiplexer can comprise an input waveguide to receive each of the N different wavelengths of light, and can also comprise an optical filter which can be formed from one or more micro-ring resonators to filter each different wavelength of light. In some embodiments of the present invention, the optical multiplexer can comprise a plurality of N optical amplitude modulators to provide the amplitude modulation for each different wavelength of light representing one of the row elements $a_i$ of the vector. In other embodiments of the present invention, each laser can be amplitude modulated by a modulation signal provided thereto to amplitude modulate the light generated by that laser to represent one of the row elements $a_i$ of the vector.

Each optical amplitude modulator in the plurality of M×N optical amplitude modulators can comprise one or more micro-ring resonators. In some embodiments of the present invention, each optical amplitude modulator can comprise a waveguide amplitude modulator. In other embodiments of the present invention, each optical amplitude modulator can comprise a ring resonator amplitude modulator. Each optical amplitude modulator in the plurality of M×N optical amplitude modulators can include a semiconductor junction (e.g. a reverse-biased semiconductor junction which can be located either in the waveguide amplitude modulator, or in the ring resonator amplitude modulator).

The present invention further relates to a vector-matrix multiplier for multiplying an N×1 vector and an M×N matrix to generate an M×1 vector-matrix product. The apparatus comprises a substrate with a number (M+1)×N of micro-ring resonator filter-modulators formed on the substrate. N of the micro-ring resonator filter-modulators each receive a different wavelength of light and amplitude modulating the light at each different wavelength in response to a plurality of first input signals provided to the N micro-ring resonator filter-modulators. Each first input signal represents a row element $a_i$ of the vector with i=1, 2 . . . N. The remaining M×N micro-ring resonator filter-modulators amplitude modulate the light at each different wavelength for a second time in response to a plurality of second input signals provided to the remaining M×N micro-ring resonator filter-modulators. Each second input signal represents a column element $b_{ji}$ of the matrix. One or more output waveguides are provided on the substrate to receive the light from the remaining M×N micro-ring resonator filter-modulators which has been amplitude modulated for the second time. Each output waveguide receives the light from a set of the remaining M×N micro-ring resonator filter-modulators which has been modulated by the second input signals which represent the column elements $b_{ji}=b_{j2} \ldots b_{jN}$ for a row j of the matrix so that an overall amplitude of the light in each output waveguide represents a row element $c_j=\Sigma a_i b_{ji}$ of the M×1 vector-matrix product.

The apparatus can further comprise one or more photodetectors, which can be formed on or off the substrate, with each photodetector receiving the light from one of the output waveguides and generating therefrom an output signal which represents one of the row elements $c_j$ of the M×1 vector-matrix product.

The apparatus can also include an optical multiplexer located on the substrate. The optical multiplexer can be formed, at least in part, from the N micro-ring resonator filter-modulators. The optical multiplexer converts the different wavelengths of light (i.e. channels of amplitude-modulated light) into an input wavelength-division-multiplexed (WDM) light stream. The input WDM light stream can be split into M substantially-equal components (also referred to herein as streamlets) by an optical splitter. Each substantially-equal component of the input WDM light stream can be provided to one of the sets of the remaining M×N micro-ring resonator filter-modulators.

Each of the (M+1)×N micro-ring resonator filter-modulators can comprise at least one micro-ring resonator which can act as a filter or an amplitude modulator, or both. Each micro-ring resonator generally has a diameter of 20 microns or less, and is formed with a monocrystalline silicon waveguide core.

Each of the (M+1)×N micro-ring resonator filter-modulators can comprise an amplitude modulator which can be either a waveguide amplitude modulator, or a ring resonator amplitude modulator. Each amplitude modulator can also include a semiconductor junction which is preferably reverse-biased for operation of the amplitude modulator.

The different wavelengths of light (i.e. channels) can be spaced apart in frequency with a substantially-equal spacing between each adjacent pair of the different wavelengths of light. The different wavelengths of light are generally infrared wavelengths in a wavelength range of 1-2 microns. Each different wavelength of light can be provided by a laser.

The present invention also relates to a vector-matrix multiplier for multiplying a vector and a matrix to generate a product of the vector and the matrix. The apparatus comprises a substrate; a plurality of lasers, either on or off the substrate, with each laser providing light at a different wavelength; and a first plurality of optical amplitude modulators on the substrate. Each optical amplitude modulator of the first plurality of optical modulators receives the light from one of the lasers and, in response to a first input signal representative of a row element $a_i$ of the vector with i=1, 2 . . . N, modulates an amplitude of the light to form a channel of amplitude-modulated light. A bus waveguide on the substrate receives each channel of amplitude-modulated light and combines each channel of amplitude-modulated light to form a wavelength-division-multiplexed (WDM) light stream. One or more transfer waveguides on the substrate are optically coupled to the bus waveguide, with each transfer waveguide receiving a portion of the WDM light stream (i.e. a streamlet) from the bus waveguide. A second plurality of optical amplitude modulators is located on the substrate proximate to each transfer waveguide. Each optical modulator of the second plurality of optical modulators couples one of the channels of amplitude-modulated light out of the portion of the WDM light stream in one of the transfer waveguides and amplitude modulates that channel of amplitude-modulated light in response to a second input signal which is representative of a column element $b_{ji}$ of the matrix, thereby forming a doubly-modulated light component. One or more output waveguides are provided on the substrate to receive the doubly-modulated light components from the optical modulators of each second plurality of optical modulators and to guide the doubly-modulated light components towards an output end of that output waveguide. A photodetector can be located proximate to the output end of each output waveguide, either on or off the substrate, to detect the doubly-modulated light components from that output waveguide and to generate therefrom an output signal representative of a row element $c_j$ of the product of the vector and the matrix.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings:

FIG. 2 illustrates the multiplication of a vector A by a matrix B to produce a vector-matrix product C.

DETAILED DESCRIPTION OF THE INVENTION

Figure 1:
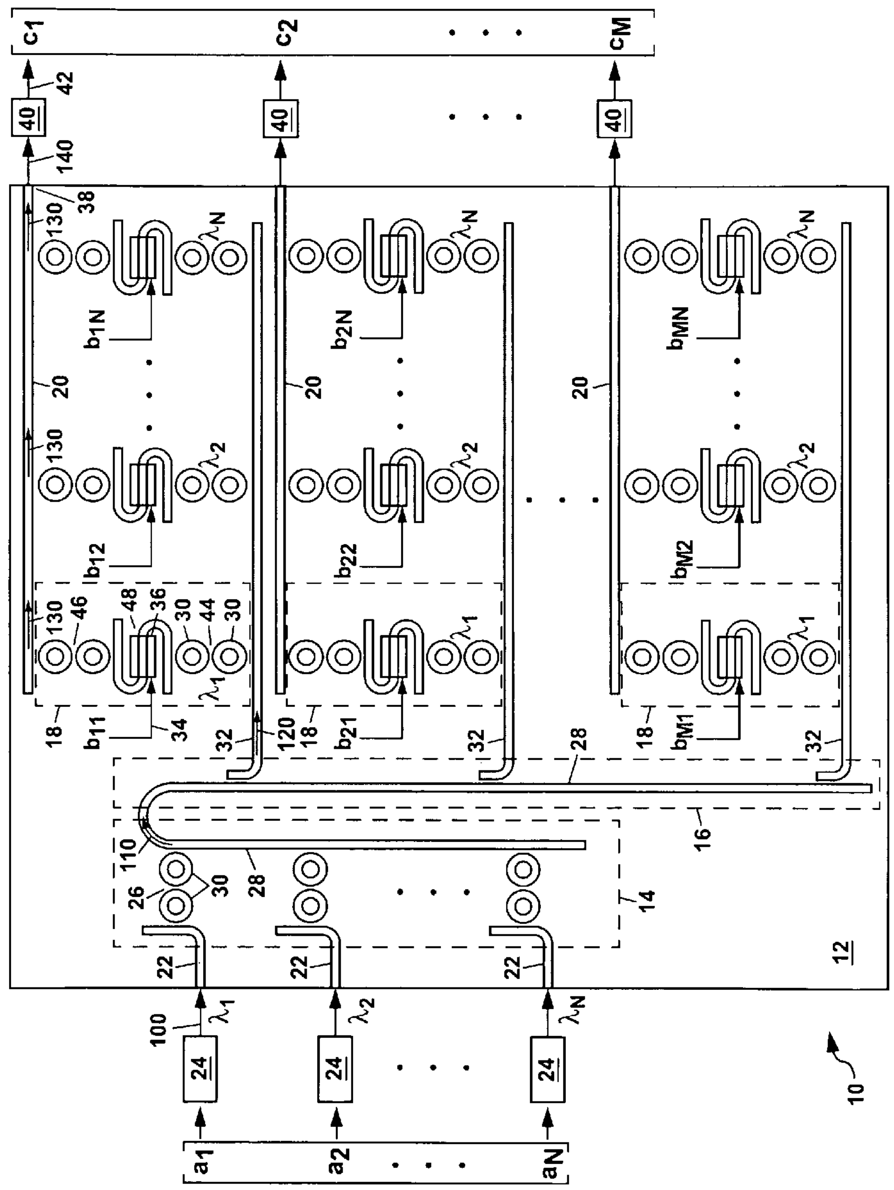
FIG. 1 shows a schematic plan view of a first example of a vector-matrix multiplier according to the present invention which can be formed, at least in part, as an integrated optic circuit.

Referring to FIG. 1, there is shown a schematic plan view of a first example of a vector-matrix multiplier (VMM) 10 according to the present invention. The apparatus 10, which can be formed at least in part as an integrated optic circuit, can be used to multiply an N×1 vector A and an M×N matrix B to generate an M×1 vector-matrix product C. This can be represented mathematically as C=A×B as illustrated in FIG. 2. FIG. 2 also shows in detail the row elements $a_i$ with i=1, 2 . . . N for the N×1 vector, the column elements $b_{ji}$ with j=1, 2 . . . M and i=1, 2 . . . N for the M×N matrix, and the resulting row elements $c_j$ given by:

$$c_j = \sum_{i=1}^{N} a_i b_{ji}$$

of the M×1 vector-matrix product C. Those skilled in the art will understand that the rank for the vector A and the matrix B can be arbitrary and can range from as small as one up to hundreds or even thousands or more depending upon the exact vector A and matrix B being multiplied.

Returning to FIG. 1, the first example of the apparatus 10 comprises a substrate 12 on which is formed an optical multiplexer 14, an optical splitter 16, a plurality of M×N optical amplitude modulators 18, and a plurality of M output waveguides 20. A representation of the vector A being multiplied is input into the apparatus 10 as a plurality of different wavelengths $\lambda_1, \lambda_2 \ldots \lambda_N$ of light 100 which are amplitude modulated provide an amplitude for each different wavelength $\lambda_1, \lambda_2 \ldots \lambda_N$ of the light 100 which represents one of the row elements $a_i$ with i=1, 2 . . . N of the vector A. The different wavelengths $\lambda_1, \lambda_2 \ldots \lambda_N$ of light 100 (also referred to herein as amplitude-modulated channels of light 100) are each directed into an input optical waveguide 22 on the substrate 12. In other embodiments of the present invention, these wavelengths $\lambda_1, \lambda_2 \ldots \lambda_N$ of light 100 can be generated directly on the substrate 12 by one or more lasers 24 located on the substrate 12.

The different wavelengths of light 100 can be generated by a plurality of lasers 24 with each laser 24 operating at a different wavelength. Alternately, a single mode-locked laser 24 can be used to simultaneously generate a plurality of different wavelengths of light 100. The different wavelengths of the light 100 can be coupled into the input optical waveguides 22 using either free-space or optical fiber coupling.

Each laser 24 can be, for example, a vertical-cavity surface-emitting laser (VCSEL) or a distributed feedback (DFB) laser. The various lasers 24 can also be provided as one or more laser arrays. The lasers 24 in FIG. 1 can be independently operated and can be amplitude modulated to encode the light 100 from each laser 24 with an amplitude (i.e. intensity) which represents one of the row elements $a_i$ of the vector A. This can be done, for example, by using an electrical input signal to a modulator section in each laser 24. Linearity of the modulation of the lasers 24 is an important consideration for accurately encoding each wavelength of the light 100 with one of the row elements $a_i$ of the vector A. In general, the lasers 24 can operate at infrared wavelengths in a wavelength range of generally 1-2 μm, and preferably 1.3-1.7 μm.

Each amplitude-modulated wavelength of light 100 is considered herein to form a channel of amplitude-modulated light 100. The various channels of the amplitude-modulated light 100 at the wavelengths $\lambda_1, \lambda_2 \ldots \lambda_N$ can be substantially-equally spaced apart in frequency by, for example, 5-50 GigaHertz (GHz), with the exact spacing between each adjacent pair of the wavelengths $\lambda_1, \lambda_2 \ldots \lambda_N$ being determined by a speed (i.e. a data rate) for multiplication of the vector A and the matrix B using the apparatus 10. Thus, for operation of the apparatus 10 at a speed of 1 GHz, adjacent wavelengths of the light 100 should be spaced apart by at least 1 GHz and preferably several GHz or more.

It should also be noted that the apparatus 10 of the present invention can be used to multiply two matrices V and T together to form a matrix-matrix product A. This can be done, for example, by decomposing the matrix V into a plurality of vectors $V_i$ with each vector $V_i$ representing one of the columns of the matrix V. The vectors $V_i$ can then be multiplied one at a time by the matrix T to generate a plurality of vector-matrix products $A_j$ which can be assembled to form columns of a matrix A which is a matrix-matrix product of the multiplication of V×T (i.e. A=V×T). The rate at which such a matrix-matrix multiplication can be performed will depend upon the number of the vectors $V_i$ and a rate at which the vectors $V_i$ can be inputted into the apparatus 10 to form the channels of amplitude-modulated light 100, and this will depend upon a bandwidth for modulation of the lasers 24. As an example, one thousand channels of amplitude-modulated light 100 can be simultaneously formed by using one thousand lasers 24 operating at wavelengths between 1500 nanometers (nm) and 1670 nm with each channel operating at a 5 GHz modulation rate and being spaced apart in frequency by 20 GHz (i.e. a 25% bandwidth utilization). This can theoretically provide a number of operations (OPS) per second on the order of $10^{15}$ and allow the multiplication of two 1000×1000 matrices on a time scale of a few milliseconds.

The different wavelengths of light 100 which are coupled into the input optical waveguides 22 in FIG. 1 can be combined in the optical multiplexer 14 to form a wavelength-division-multiplexed (WDM) light stream 110. The optical multiplexer 14 can optionally comprise a plurality of N optical filters 26 as shown in FIG. 1, with each filter 26 being tuned to one of the wavelengths $\lambda_1, \lambda_2, \ldots \lambda_N$ of the light 100. This is useful to maintain a precise spacing between the adjacent channels of light 100, and can also be used in a feedback loop to each laser 24 to stabilize the wavelength of the light 100 from that laser 24. Each wavelength $\lambda_1, \lambda_2, \ldots \lambda_N$ of the light 100 can be coupled into one of the optical filters 26 using evanescent coupling, and then coupled out of that optical filter 26 into a bus waveguide 28 by evanescent coupling.

In the apparatus 10 of the present invention, the optical filters 26 can be formed using one or more micro-ring resonators 30 (also termed optical ring resonators) which are located between the input optical waveguides 22 and the bus waveguide 28. Each micro-ring resonator 30 can be formed either as an open ring having an annular shape (e.g. a circular, elliptical or oval shape), or as a disk (e.g. with a circular, elliptical or oval shape). The use of two evanescently-coupled micro-ring resonators 30 for each optical filter 26 as shown in FIG. 1 is useful to provide a relatively narrow bandpass for the light 100 with a high throughput from each input optical waveguide 22 to the bus waveguide 28. In other embodiments of the present invention, a single micro-ring resonator 30 can be used for each optical filter 26.

The light 100 at a particular wavelength $\lambda_i$ with i=1, 2 . . . N will be coupled into and through each micro-ring resonator 30 when the frequency of the light 100 is substantially equal to a resonant frequency of that micro-ring resonator 30. At resonance, the light 100 is coupled into the micro-ring resonator 30 and circulates around the resonator 30. The light 100 at resonance will also be coupled through the optical filter 26 and into the bus waveguide 28 with very little, if any, loss. The exact wavelength $\lambda_i$ which is resonant with each micro-ring resonator 30 will depend upon an outer diameter of that micro-ring resonator 30. The outer diameter of the micro-ring resonators 30 can be very small, generally ranging from about 20 μm down to only a few microns (e.g. 4 μm) when the micro-ring resonators 30 have a waveguide core which comprises monocrystalline silicon.

In the example of FIG. 1, micro-ring resonators 30 are used for the optical filters 26 due to their high finesse and low loss. Other types of optical filters known to the art can also be used in the apparatus 10 of the present invention. In some embodiments of the present invention, the optical filters 26 can be omitted altogether from the optical multiplexer 14.

In FIG. 1, the WDM light stream 110 is transmitted out of the optical multiplexer 14 and into the optical splitter 16 which splits the WDM light stream 100 into a plurality of M portions 120 which are also referred to herein as light streamlets 120. This can be done using evanescent coupling from the bus waveguide 28 into a plurality of transfer waveguides 32, with the bus waveguide 28 extending from the multiplexer 14 into the splitter 16 as shown in FIG. 1. In other embodiments of the present invention, the optical splitter 16 can comprise a plurality of branching waveguide Y-junctions to split the WDM light stream 110 and form the plurality of M light streamlets 120. In yet other embodiments of the present invention, the optical splitter 16 can be formed from one or more multi-mode interference (MMI) splitters.

In FIG. 1, the M×N optical amplitude modulators 18 are arranged in M rows corresponding to the M rows of the matrix B, with each row of the modulators 18 comprising N modulators 18. A first modulator 18 of each row of the modulators 18 (indicated by the dashed box and label "18") receives from the transfer waveguide 32 for that row the channel of the light 100 at the wavelength $\lambda_1$ which has been previously modulated with an amplitude that represents the vector element $a_1$ of the vector A. The light 100 in this first channel is then modulated by the first modulator 18 of each row of the modulators 18 for a second time to produce a doubly-modulated light component 130. This additional modulation is performed using an input signal 34 provided to the first modulator 18 in each row of the modulators 18, with the input signal 34 representing the matrix element $b_{j1}$ with j=1, 2 . . . M where M represents a row number for the M rows of modulators 18 corresponding to the same row number of the matrix B. The doubly-modulated light components 130 from each first modulator 18 are evanescently coupled into the output waveguide 20 to contribute to an output WDM light stream 140 being formed therein.

The linearity of the modulators 18 is an important consideration since this will determine, at least in part, the accuracy of the vector-matrix multiplication performed by the apparatus 10. Each modulator 18 should, therefore, be linear to a number n of bits (e.g. 8 bits) required for the vector-matrix product C. For multiplication which requires a larger number of bits than can be provided by the linearity of the modulators 18, the elements for the vector A and matrix B can be separated into a plurality of n-bit numbers which can then be separately multiplied in the apparatus 10 and recombined to provide a required level of precision for the vector-matrix product C. Thus, for example, to multiply a vector A and a matrix B each having 16-bit elements to obtain the same level of precision in the vector-matrix product C when the modulators 18 are only accurate to 8-bits of precision, each 16-bit element in the vector A can be represented as a product of two 8-bit elements denoted $A^{MSB}$ representing the most significant bits of the 16-bit element and $A^{LSB}$ representing the least significant bits of that same 16-bit element. Similarly, each element in the matrix B can be separated into two 8-bit numbers denoted $B^{MSB}$ and $B^{LSB}$. Each element $C_i$ in the vector-matrix product C=A×B can then be determined by $C_i=A^{MSB}\times B^{MSB}+A^{MSB}\times B^{LSB}+A^{LSB}\times B^{MSB}+A^{LSB}\times B^{LSB}$.

In the example of FIG. 1, a second modulator 18 in each row of the modulators 18 separates out of the transfer waveguide 32 for that row the channel of light 100 at the wavelength $\lambda_2$ and modulates the light 100 in this channel for a second time using an input signal 34 that represents one of the matrix elements $b_{j2}$ with j=1, 2 . . . M. This produces additional doubly-modulated light components 130 which are coupled into the output waveguide 20 for that row of the modulators 18 and added to the WDM light stream 140 being formed in that output waveguide 20. This process continues for each modulator 18 in each row of the modulators 18. The input signals 34 will generally be electrical signals although, in some embodiments of the present invention, the input signals 34 can be optical signals (e.g. when a focal plane array is located above the plurality of modulators 18, or when each modulator 18 includes a photodiode).

The result of this modulation is that the output WDM light stream 140 at an output end 38 of the output waveguide 20 for a first row of the modulators 18 represents the products $a_1b_{11}$, $a_1b_{12}$, . . . $a_1b_{1N}$; the output WDM light stream 140 for a second row of the modulators represents the products $a_2b_{21}$, $a_2b_{22}$, . . . $a_2b_{2N}$; and so on down to an Mth row of the modulators 18 where the output WDM light stream 140 represents the products $a_Mb_{M1}$, $a_Mb_{M2}$, . . . $a_1b_{MN}$. Thus, each WDM light stream 140 contains the information needed to form one of the row elements $c_j=\Sigma a_ib_{ji}$ for the vector-matrix product C. All that is needed is to perform the summation of the products in each output WDM light stream 140. This can be done using a separate photodetector 40 to detect each output WDM light stream 140.

In the example of FIG. 1, a plurality of photodetectors 40 are shown located off of the substrate 12; whereas in other embodiments of the present invention, the photodetectors 40 can be located on the substrate 12 (e.g. as waveguide photodetectors 40). The photodetectors 40 in the example of FIG. 1 can be individual photodetectors 40 which can be coupled to the output waveguides 20 through free-space or optical fibers. The photodetectors 40 can be provided as a photodetector array (e.g. a one-dimensional photodetector array).

In the example of FIG. 1, each optical amplitude modulator 18 can be formed as a filter-modulator which comprises an input optical filter 44 which can be formed from one or more micro-ring resonators 30, and an output optical filter 46 which can be formed from one or more additional micro-ring resonators 30. A waveguide amplitude modulator 48 can be located between the input optical filter 44 and the output optical filter 46. The waveguide amplitude modulator 48 comprises an optical waveguide with one or more electrodes 36 covering a portion thereof to produce an optical absorption of the light 100 due to electroabsorption in a reverse-biased semiconductor p-n or p-i-n junction located in or about the optical waveguide.

In other embodiments of the present invention as will be described in detail hereinafter, a ring resonator amplitude modulator 82 or 82' can be substituted for the waveguide amplitude modulator 48. The ring resonator amplitude modulator 82 or 82' can be used together with the input optical filter 44 and the output optical filter 46 as shown in FIG. 1, or can be used alone to perform both a filtering function and an amplitude modulation function of the optical amplitude modulator 18 (see FIG. 8). The ring resonator amplitude modulator 82 or 82' can be formed from a micro-ring resonator 30 having electrodes 36 to provide electrical connections to at least a portion of the micro-ring resonator 30 wherein a semiconductor p-n or p-i-n junction is formed. With the application of a reverse-bias voltage, the semiconductor junction can deplete carriers (i.e. photogenerated electrons and holes) to absorb a portion of the light 100 therein, and thereby amplitude modulate the light 100. Additionally, the semiconductor p-n or p-i-n junction in the ring resonator amplitude modulator 82 or 82' can change a resonant frequency of the micro-ring resonator 30 which can also affect the transmission of the light 100 through the micro-ring resonator 30 in the ring resonator amplitude modulator 82 or 82'.

Figure 3:
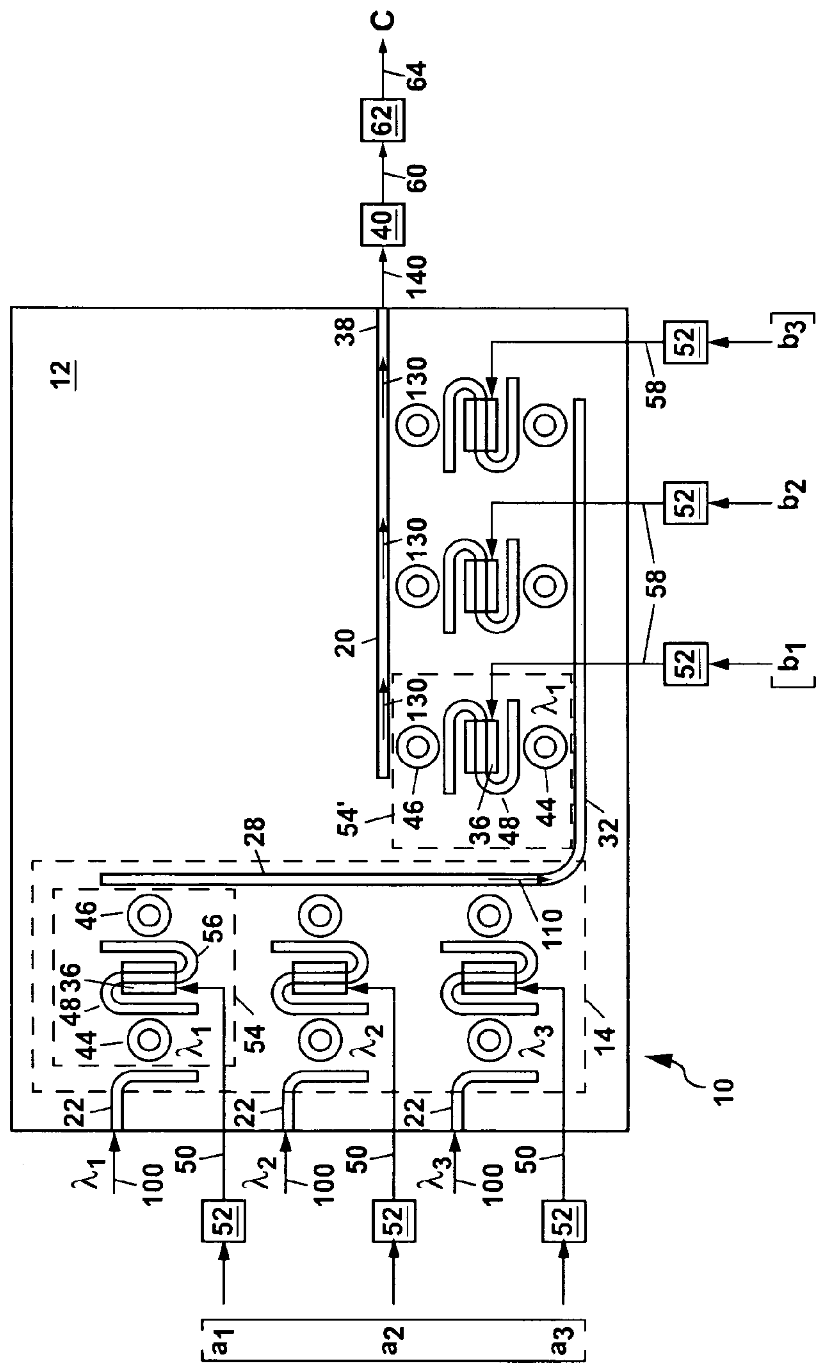
FIG. 3 shows a schematic plan view of a second example of the vector-matrix multiplier of the present invention. This second example multiplies a 1×3 vector A by a 3×1 vector B to obtain a vector-vector product C which is a scalar number.

FIG. 3 shows a schematic plan view of a second example of the apparatus 10 of the present invention. In the example of FIG. 3, the apparatus 10 can be used to perform a vector-vector multiplication by multiplying a 3×1 vector A with elements $a_1$, $a_2$, $a_3$ and a 1×3 vector B with elements $b_1$, $b_2$, $b_3$ to obtain a 1×1 vector-vector product $C=a_1b_1+a_2b_2+a_3b_3$ which is a scalar. It should be noted that the terms "vector" and "matrix" can be used interchangeably when the rank is the same for each. Thus, a matrix of rank 1 (i.e. a 1×N matrix, or an N×1 matrix) is a vector. One skilled in the art will therefore understand that the example of FIG. 3 represents a special case of vector-matrix multiplication using the apparatus 10.

In the example of FIG. 3, each element $a_1$, $a_2$ and $a_3$ of the vector A can be input into the apparatus 10 as a first input signal 50 which is generally an analog signal (e.g. an analog electrical signal). When the row elements $a_1$, $a_2$, $a_3$ of the vector A are provided as digital elements (i.e. digital signals), these digital elements can be converted into analog elements (i.e. analog signals 50) using a plurality of digital-to-analog (D/A) converters 52 as shown in FIG. 3. The D/A converters 52 can be located off the substrate 12 as shown in FIG. 3, or alternately can be formed on the substrate 12 as an integrated circuit (e.g. a CMOS integrated circuit). Providing each first input signal 50 as an analog signal is useful to speed up the matrix-matrix multiplication as compared to providing each signal 50 as a digital signal.

The light 100 at three different wavelengths $\lambda_1$, $\lambda_2$, and $\lambda_3$, which is used in the apparatus 10 of FIG. 3, can be provided either by three different lasers 24 or alternately by a mode-locked laser 24 emitting light at the three different wavelengths $\lambda_1$, $\lambda_2$, and $\lambda_3$. In some cases, the light 100 at the three different wavelengths $\lambda_1$, $\lambda_2$, and $\lambda_3$, can be generated remotely, and coupled into the apparatus of FIG. 3 using one or more optical fibers or via free-space coupling. Each different wavelength of the light 100 can be directed into an input optical waveguide 22 and therefrom into an optical multiplexer 14.

The optical multiplexer comprises three optical amplitude modulators 54 located between the input optical waveguides 22 and a bus waveguide 28. Each optical amplitude modulator 54 can be formed on the substrate 12 as a micro-ring resonator filter-modulator with an input optical filter 44 and an output optical filter 46 and a waveguide amplitude modulator 48 located therebetween. The optical filters 44 and 46 in this example are each formed from a micro-ring resonator 30; and the waveguide amplitude modulators 48 each comprise a serpentine optical waveguide 56 with one or more electrodes 36 provided over a part or all of the serpentine optical waveguide 56 to receive the first input signal 50 which represents a particular element $a_1$, $a_2$, $a_3$ for that modulator 48.

Each wavelength $\lambda_1$, $\lambda_2$, $\lambda_3$ of the light 100 in the example of FIG. 3 is modulated for a first time by the optical amplitude modulators 54 in response to the first input signals 50 to form three separate channels of amplitude-modulated light 100, and then the three channels of the amplitude-modulated light 100 are evanescently coupled into the bus waveguide 28 and combined therein to form an input WDM light stream 110, with each different wavelength $\lambda_1$, $\lambda_2$, and $\lambda_3$ of the light 100 having an amplitude which represents one of the elements $a_1$, $a_2$, $a_3$ of the 3×1 vector A.

An additional three optical amplitude modulators 54' are provided on the substrate 12 and evanescently coupled to a transfer waveguide 32 which, in turn, is coupled to the bus waveguide 28. Each modulator 54' couples one of the wavelengths $\lambda_1$, $\lambda_2$, $\lambda_3$ of the light 100 out of the input WDM light stream 110 and modulates that wavelength of the light 100 for a second time in response to a plurality of second input signals 58 provided to the optical amplitude modulators 54'. These second input signals 58 represent the column elements $b_1$, $b_2$, $b_3$ of the 1×3 vector B. When the second input signals 58 are provided as digital elements (i.e. digital signals), the digital elements can be converted into analog elements (i.e. analog signals 58) using three additional digital-to-analog (D/A) converters 52.

Each of the three optical amplitude modulators 54' in the example of FIG. 3 is formed as a micro-ring resonator filter-modulator comprising an input filter 44 and an output filter 46, each comprising a micro-ring resonator 30, and a waveguide amplitude modulator 48 located between the two filters 44 and 46. The input filter 44 in each modulator 54' filters the input WDM light stream 110 so that only a single wavelength $\lambda_1$, $\lambda_2$ or $\lambda_3$ of the light 100 is coupled into that modulator 54'. The waveguide amplitude modulator 48 then changes (i.e. modulates) the intensity of that single wavelength of the light 100 in proportion to the second input signal 58 applied to that modulator 54'. This forms a doubly-modulated light component 130 which is then filtered by the output filter 46 and coupled into an output waveguide 20. The doubly-modulated light components 130 from each modulator 54' are combined in the output waveguide 20 to form an output WDM light stream 140 which is guided to the output end 38 of the waveguide 20. The output WDM light stream 140 has an overall amplitude which represents the sum of the products $a_1b_1$, $a_2b_2$ and $a_3b_3$ and thereby represents the vector-vector product $C=\Sigma a_ib_i$ with i=1, 2 and 3. The output WDM light stream 140 can be detected with a photodetector 40 to generate an output signal 60 which is an analog output signal. An analog-to-digital converter 62 can be used to convert the analog output signal into a digital output signal 64 to represent the vector-vector product C in digital form.

Figure 4:
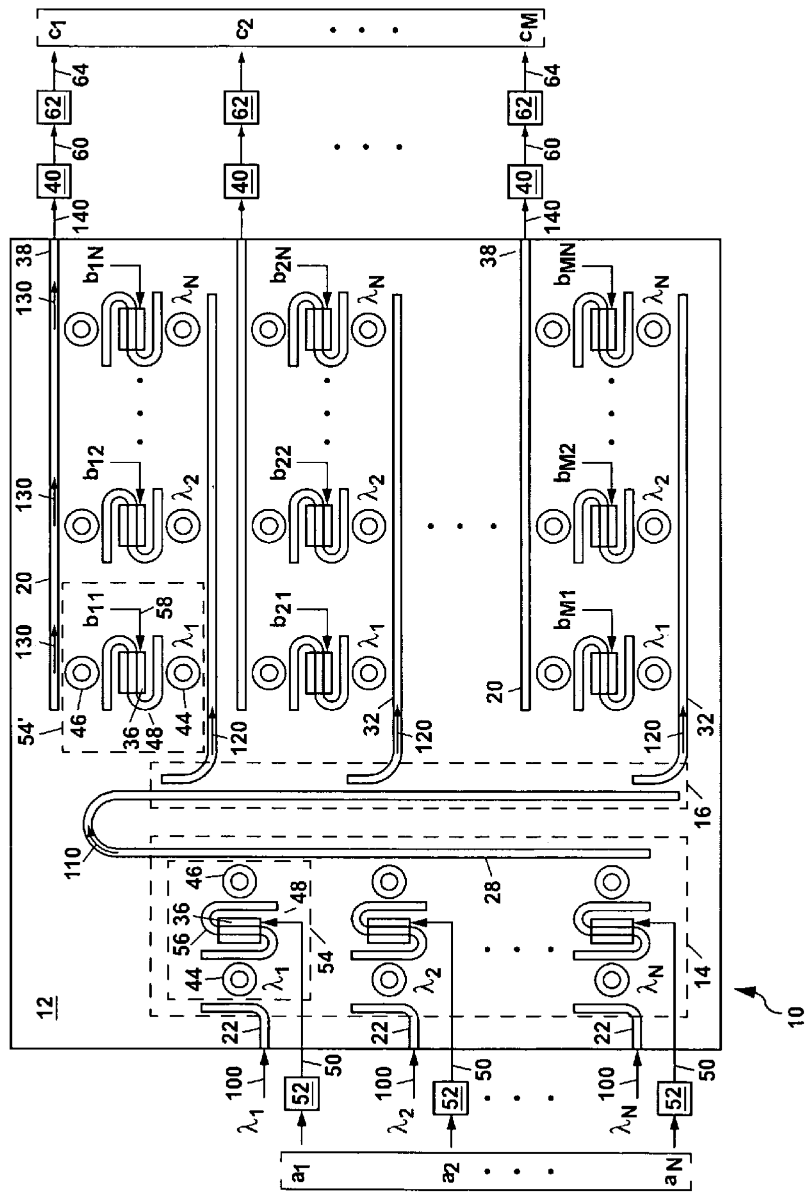
FIG. 4 shows a schematic plan view of a third example of the vector-matrix multiplier of the present invention.

The example of FIG. 3 can be extended to multiply an N×1 vector A and an M×N matrix B to generate an M×1 vector-matrix product C where N and M are arbitrary integers. This is schematically illustrated in plan view in FIG. 4. In this example of the present invention, a plurality of N optical amplitude modulators 54 are provided in the optical multiplexer 14 to receive N different wavelengths $\lambda_i$ with i=1, 2 . . . N of the light 100 and to form therefrom N separate channels of amplitude-modulated light 100 using N first input signals 50 to the N modulators 54. Each first input signal 50 represents one of the row elements $a_i$ with i=1, 2 . . . N of the vector A. Each channel of the amplitude-modulated light 100 has an amplitude (i.e. intensity) of the light 100 which is representative of the row element $a_i$ for that channel. When the row elements $a_i$ are provided as digital signals, they can be converted into analog signals 50 using D/A converters 52 as shown in FIG. 4.

The N channels of the amplitude-modulated light 100 are coupled into a bus waveguide 28 and combined therein to form an input WDM light stream 110 which is then fed into an optical splitter 16 to divide the input WDM light stream 110 into a plurality of M light streamlets 120. Each light streamlet 120 is coupled out of the optical splitter 16 into a transfer waveguide 32 which is further optically coupled to a plurality of N additional optical amplitude modulators 54' which can be arranged in a row adjacent to that transfer waveguide 32. Altogether, there are M transfer waveguides 32 and M×N modulators 54'. Each modulator 54' in each row couples a different wavelength $\lambda_i$ of the light 100 out of the input WDM light stream 110 and then amplitude modulates that wavelength of the light 100 for a second time in response to a second input signal 58 which represents a column element $b_{ji}$ of the M×N matrix B. This produces a doubly-modulated light component 130 which is then coupled out of the modulator 54' and into an output waveguide 20 for that row of the modulators 54'. The doubly-modulated light components 130 for a particular row of the modulators 54' form an output WDM light stream 140 which can be detected with a photodetector 40 to generate an output signal 60 which is an analog representation of one of the row elements $c_i=\Sigma a_ib_{ij}$ of the vector-matrix product C. The signal 60 can be converted into a digital output signal 64 using an A/D converter 62.

Each modulator 54 and 54' can be formed as a micro-ring resonator filter-modulator as previously described with reference to FIG. 3. Altogether (M+1)×N modulators 54 and 54' are used in the apparatus 10 of FIG. 4, with N of the modulators 54 being used to modulate the various wavelengths $\lambda_i$ with i=1, 2 . . . N of the light 100 for a first time, and with the remaining M×N modulators 54' being used to modulate the wavelengths $\lambda_i$ of the light 100 for a second time.

Figure 5A:
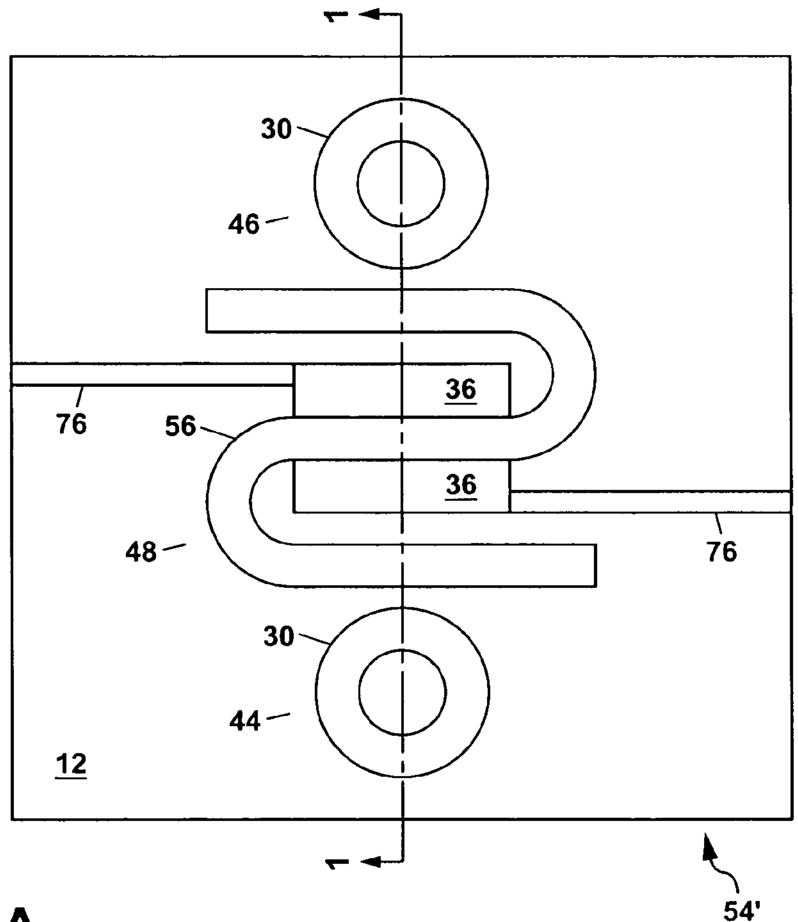
FIG. 5A shows a schematic plan view of a waveguide amplitude modulator which can be used in the apparatus of the present invention.
Figure 5B:
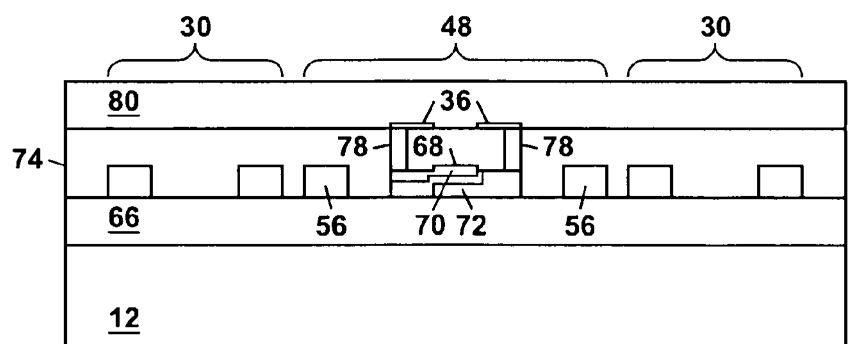
FIG. 5B shows a schematic cross-section view of the waveguide amplitude modulator of FIG. 5A along the section line 1-1 in FIG. 5A.

FIGS. 5A and 5B show, respectively, a schematic plan view and a schematic cross-section view of one of the modulators 54' to illustrate fabrication of the modulators 54 and 54' and the apparatus 10 for the examples of the present invention presented heretofore. The devices 10 in the examples of FIGS. 1, 3 and 4 can be fabricated, for example, using a silicon-on-insulator (SOI) substrate. The SOI substrate comprises a monocrystalline silicon body which forms the substrate 12 in the completed device 10 of FIGS. 1, 3 and 4. The SOI substrate also comprises a monocrystalline silicon layer which can be patterned to form the micro-ring resonators 30 and the serpentine optical waveguide 56 and the various other waveguides 20, 22, 28 and 32. The monocrystalline silicon layer can be, for example, about 0.25 μm thick when the wavelengths $\lambda_i$ are in the range of about 1.5-1.7 μm. Sandwiched between the monocrystalline silicon body and the monocrystalline silicon layer is a silicon oxide layer 66 which can be, for example, 1-3 μm thick.

To form the micro-ring resonators 30, the serpentine optical waveguide 56 and the various other waveguides 20, 22, 28 and 32 in the devices 10 of FIGS. 1, 3 and 4, a photolithographically-defined etch mask can be formed over the monocrystalline silicon layer and then this layer can be reactive ion etched. One or more oxidation steps can then be performed at an elevated temperature in the range of about 950-1100° C. to remove any etch damage from sidewalls of the micro-ring resonators 30 and the waveguides 20, 22, 28, 32 and 56. The oxidation step converts a thin (about 5 nanometers) exposed surface portion of the monocrystalline silicon layer to silicon dioxide, thereby smoothing the sidewalls to reduce a propagation loss of the light 100.

The waveguides 20, 22, 28, 32 and 56 and a curved waveguide used to form the micro-ring resonators 30 can be, for example, 0.4-0.55 μm wide. An outer diameter for each micro-ring resonator 30 will generally be about 20 μm or less and can be as small as 3-4 μm. A spacing between the micro-ring resonators 30 and the various waveguides 20, 22, 28, 32 and 56 for evanescent optical coupling can be, for example, 0.15-0.35 μm.

A central section 68 of the serpentine optical waveguide 56 can be etched to form a ridge waveguide (also referred to as a ridge waveguide). The central section 68 can then be ion implanted with a p-type dopant (e.g. boron) and an n-type dopant (e.g. arsenic or phosphorous) to form a semiconductor junction (e.g. a p-n or p-i-n junction) for each optical amplitude modulator 18, 54 and 54'. The semiconductor junction comprises a p-type-doped region 70 and an n-type-doped region 72. The semiconductor junction can be formed, for example, by implanting boron (B) ions with a peak boron ion concentration of about $10^{18}$ $cm^{-3}$ to form the p-type-doped region 70, and by implanting arsenic (As) ions to form the n-type-doped region 72 with about the same peak ion concentration. The ion energy used for implanting the B and As ions can be selected so that the p-type-doped region 70 will be formed on one side of the semiconductor junction (e.g. a top side as shown in FIG. 5B) and so that the n-type-doped region 72 will be formed on the other side of the semiconductor junction (e.g. on a bottom side thereof as shown in FIG. 5B).

As an example, the B ions can be implanted at an energy of about 110 keV; and the As ions can be implanted at an energy of about 380 keV.

The implanted B ions will generally have a tail of lower ion concentration which extends into the n-type-doped region 72; and the implanted As ions will have a tail of lower ion concentration which extends into the p-type-doped region 70. An area of overlap of the lower-ion-concentration n-type and p-type tails can form an intrinsic (i) region of the semiconductor junction between the p-type-doped region 70 and the n-type-doped region 72. Thus, depending upon an ion implant profile for the p-type and n-type doping, either a semiconductor p-n or p-i-n junction can be formed for the waveguide amplitude modulator 48 in FIGS. 5A and 5B. After ion implanting the p-type and n-type dopants, a thermal annealing step at an elevated temperature of about 900° C. can be used to activate the implanted ions in the semiconductor junction.

The semiconductor junction shown in FIGS. 5A and 5B is a vertical semiconductor junction; whereas in other embodiments of the present invention, the semiconductor junction can be formed as a horizontal semiconductor junction with the p-type-doped and n-type-doped regions 70 and 72 being located side by side. In other embodiments of the present invention, the semiconductor junction can also be formed by thermally diffusion or by doping during epitaxial growth. As an example, an SOI substrate can be procured with a monocrystalline silicon layer of a first doping type (e.g. n-type doped), and an impurity dopant of the opposite doping type (e.g. p-type) can be thermally diffused into the monocrystalline silicon layer to form the semiconductor junction. As another example, an SOI substrate can be procured with a monocrystalline silicon layer of the first doping type, and another monocrystalline silicon layer of the opposite doping type can be epitaxially grown upon the monocrystalline silicon layer to form the semiconductor junction.

After formation of the semiconductor junction, a passivation layer 74 of an electrically-insulating material such as silicon dioxide or a silicate glass (e.g. TEOS formed from the thermal decomposition of tetraethyl orthosilicate) can be blanket deposited over substrate 12 and planarized using a chemical-mechanical polishing (CMP) step to provide a layer thickness of, for example, 0.9 μm. This passivation layer 74, which can comprise TEOS deposited by plasma-enhanced chemical vapor deposition (PECVD), encapsulates the micro-ring resonators 30 and the waveguides 20, 22, 28, 32 and 56 to form a low-refractive-index cladding about these elements. The passivation layer 74 also passivates the semiconductor junction, and also provides a support for wiring 76 (e.g. comprising aluminum) which can be used to provide the electrical input signals 34, 50 and 58 to the optical amplitude modulators 18, 54 and 54', respectively, and also to provide a ground electrical connection for each modulator 18, 54 and 54'.

Openings can then be reactive ion etched through the passivation layer 74 in preparation for depositing metal vias 78 to connect the semiconductor junction to the wiring 76 which will be formed later on the passivation layer 74. After the openings in the passivation layer 74 are formed, an exposed surface of the monocrystalline silicon layer in each opening can be silicided using sputter-deposited layers of titanium and titanium nitride followed by a rapid thermal annealing step to convert these deposited layers into titanium silicide. The metal vias 78 (e.g. comprising tungsten) can then be deposited to overfill the openings; and another CMP step can be used to planarize the metal back to or slightly below the level of the passivation layer 74. The electrodes 36, wiring 76 and contact pads (not shown), which can comprise aluminum or an aluminum alloy (e.g. Al—Cu) can then be blanket deposited over the surface of the passivation layer 74 and patterned by etching using a photolithographically-defined etch mask.

Another passivation layer 80 can then be deposited by PECVD to cover the electrodes 36 and wiring 76. This passivation layer 80 can comprise, for example, about 1 μm of a phosphorous glass which can be blanket deposited over the substrate 12 and which does not need to be planarized after deposition. Openings can be etched through this passivation layer 80 to open up the contact pads (not shown) for making external electrical connections to the wiring 76.

The input signal 34, 50 or 58 to the waveguide amplitude modulator 48 can be a reverse-bias voltage of up to a few volts which is applied across the semiconductor junction. This causes the semiconductor junction to absorb the light 100 passing through the waveguide amplitude modulator 48 and thereby provide the amplitude modulation for operation of the device 10.

In embodiments of the present invention wherein a waveguide photodetector 40 is to be formed on the substrate 12 proximate to the end 38 of each output waveguide 20, the photodetector 40 can be formed from a portion of the output waveguide 20 by forming a semiconductor junction in a manner similar to that described above for the waveguide amplitude modulator 48. In this case, reverse-biasing of the semiconductor junction in the waveguide photodetector 40 with a direct-current (dc) voltage of up to a few volts absorbs the output WDM light stream 140 to generate the output signal 60. The waveguide photodetector 40 can have a length of up to a few hundred microns.

Figure 6A:
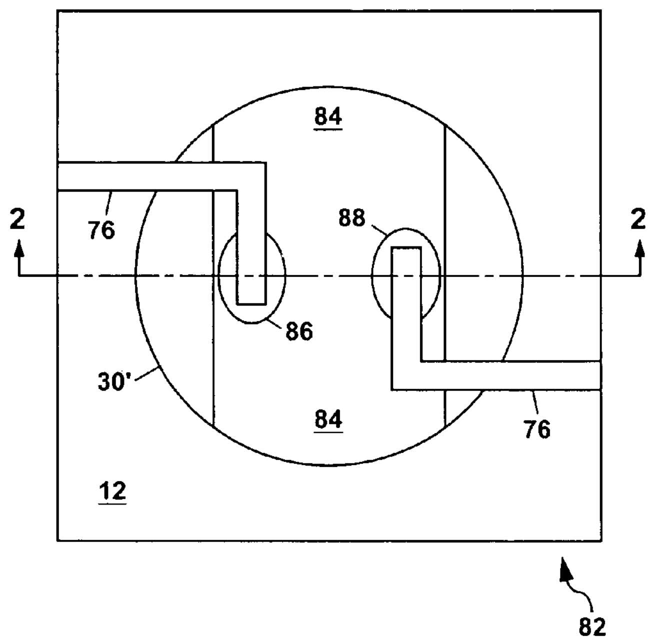
FIG. 6A shows a schematic plan view of a ring resonator amplitude modulator which can be used in the apparatus of the present invention.
Figure 6B:
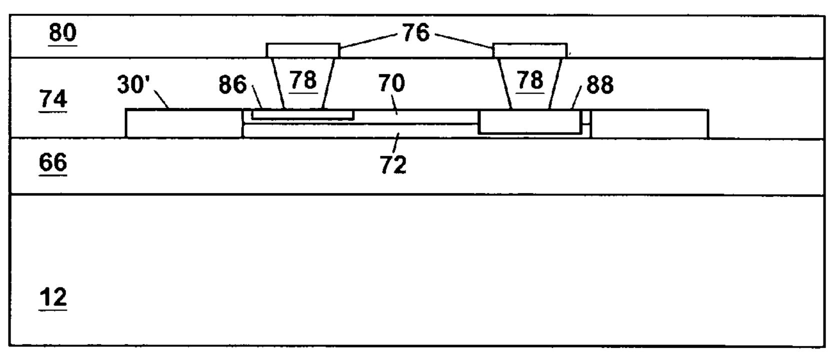
FIG. 6B shows a schematic cross-section view of the ring resonator amplitude modulator of FIG. 6A along the section line 2-2 in FIG. 6A.

FIGS. 6A and 6B show schematic plan and cross-section views, respectively, of a ring resonator amplitude modulator 82 which can be substituted for the waveguide amplitude modulator 48 in each of the examples of the present invention presented herein. The ring resonator amplitude modulator 82 can comprise a disk-shaped micro-ring resonator 30' (also termed a microdisk resonator) which can be formed from a monocrystalline silicon layer of an SOI substrate 12 when the SOI substrate 12 is used for the apparatus 10. The microdisk resonator 30' can have a diameter of, for example, 4-20 μm with the light 100 circulating around the microdisk resonator 30' proximate to an outer periphery thereof in a so-called “whispering gallery” mode. Amplitude modulation of the light 100 can be performed by using a semiconductor junction which can be formed in a portion 84 of the microdisk resonator 30' as shown in FIG. 6A. In some cases, the semiconductor junction can extend throughout the entire microdisk resonator 30'.

The semiconductor junction can be formed as previously described with reference to FIG. 5B by implanting a p-type dopant (e.g. boron) and an n-type dopant (e.g. arsenic or phosphorous) into the monocrystalline silicon layer of the SOI substrate to form the p-type-doped region 70 and the n-type-doped region 72. Additional ion implant steps can be used to form a p-type-doped plug 86 and an n-type-doped plug 88 with a much higher impurity doping level (e.g. to about $10^{21}$ $cm^{-3}$) to facilitate electrically contacting each side of the semiconductor junction. After the ion implantation steps, a high-temperature (e.g. 900° C.) annealing step can be used to activate the implanted ions.

After formation of the semiconductor junction, a passivation layer 74 (e.g. silicon dioxide or a silicate glass such as TEOS) can be blanket deposited over substrate 12 and planarized by a CMP to encapsulate the microdisk resonator 30' and other elements of the apparatus 10 including the waveguides 20, 22, 28, 32 and any micro-ring resonators 30.

As described previously, the passivation layer 74 also forms a low-refractive-index cladding, passivates the semiconductor junction, and supports the wiring 76. Openings can then be etched through the passivation layer 74, and metal vias 78 can be formed to connect the semiconductor junction to the wiring 76. Another passivation layer 80 can then be blanket deposited to cover the wiring 76 to complete the apparatus 10 containing the ring resonator amplitude modulators 82.

Figure 7A:
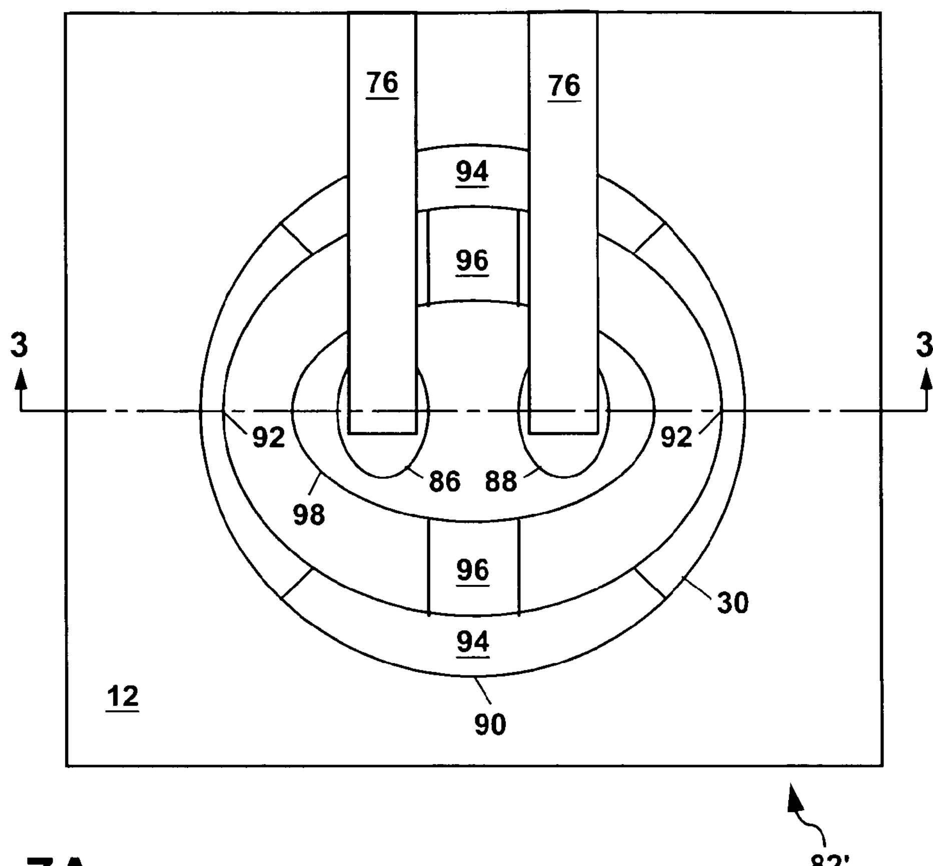
FIG. 7A shows a schematic plan view of another ring resonator amplitude modulator which can be used in the apparatus of the present invention.
Figure 7B:
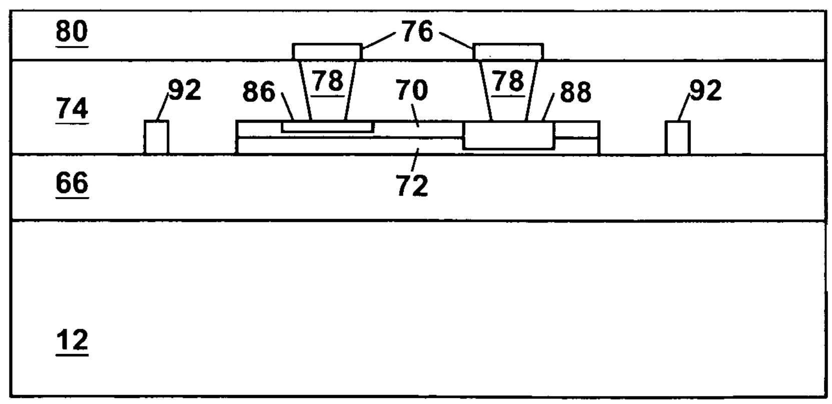
FIG. 7B shows a schematic cross-section view of the ring resonator amplitude modulator of FIG. 7B along the section line 3-3 in FIG. 7A.

FIGS. 7A and 7B show schematic plan and cross-section views, respectively, of yet another type of ring resonator amplitude modulator 82' which can be substituted for the waveguide amplitude modulator 48 in each of the examples of the present invention presented herein. This ring resonator amplitude modulator 82' comprises a micro-ring resonator 30 having a waveguide width which adiabatically varies between a maximum value 90 of the waveguide width and a minimum value 92 thereof. Coupling into and out of the micro-ring resonator 30 occurs near the minimum value 92 of the waveguide width, while electrical connections to a semiconductor junction located in at least a portion 94 of the micro-ring resonator 30 occurs proximate to the maximum value 90 of the waveguide width of the micro-ring resonator 30 in the modulator 82'. The minimum value 92 of the waveguide width can be, for example, about 0.55 μm when the micro-ring resonator 30 is formed in the monocrystalline silicon layer of an SOI substrate and operated at wavelengths near 1.5 μm; and the maximum value 90 of the waveguide width can be about twice the minimum value 92. The micro-ring resonator 30 can have a diameter of, for example, 4-20 μm or more.

Electrical connections to the micro-ring resonator 30 in FIGS. 7A and 7B can be made using one or more connecting members 96 which extend between the micro-ring resonator 30 and a contact region 98 of the modulator 82' which can be located inside the micro-ring resonator 30. The contact region 98 can be, for example, elliptical with dimensions of about 1 μm×2 μm; and each connecting member 96 having a width of about 0.5 μm, for example. Locating the electrical connections proximate to the maximum value 90 of the waveguide width of the micro-ring resonator 30 minimizes any optical propagation loss of the light 100 within the micro-ring resonator 30 due to the connecting members 96. The light 100 propagates around the micro-ring resonator 30 in FIGS. 7A and 7B in a so-called "whispering gallery" mode which is located near an outside sidewall of the micro-ring resonator 30.

The semiconductor junction, which can be formed as previously described with reference to FIGS. 6A and 6B, is present in the portion 94 and can also extend through the connecting members 96 to the contact region 98.

The ring resonator amplitude modulator 82' of FIGS. 7A and 7B can operate with a reverse-bias voltage of up to a few volts connected through the wiring 76 to the semiconductor junction in each portion 94 of the micro-ring resonator 30. The reverse-bias voltage can be modulated at a predetermined data rate which can be up to 1 GHz or more to provide an amplitude modulation of the light 100 in the modulator 82' at the same data rate.

Figure 8:
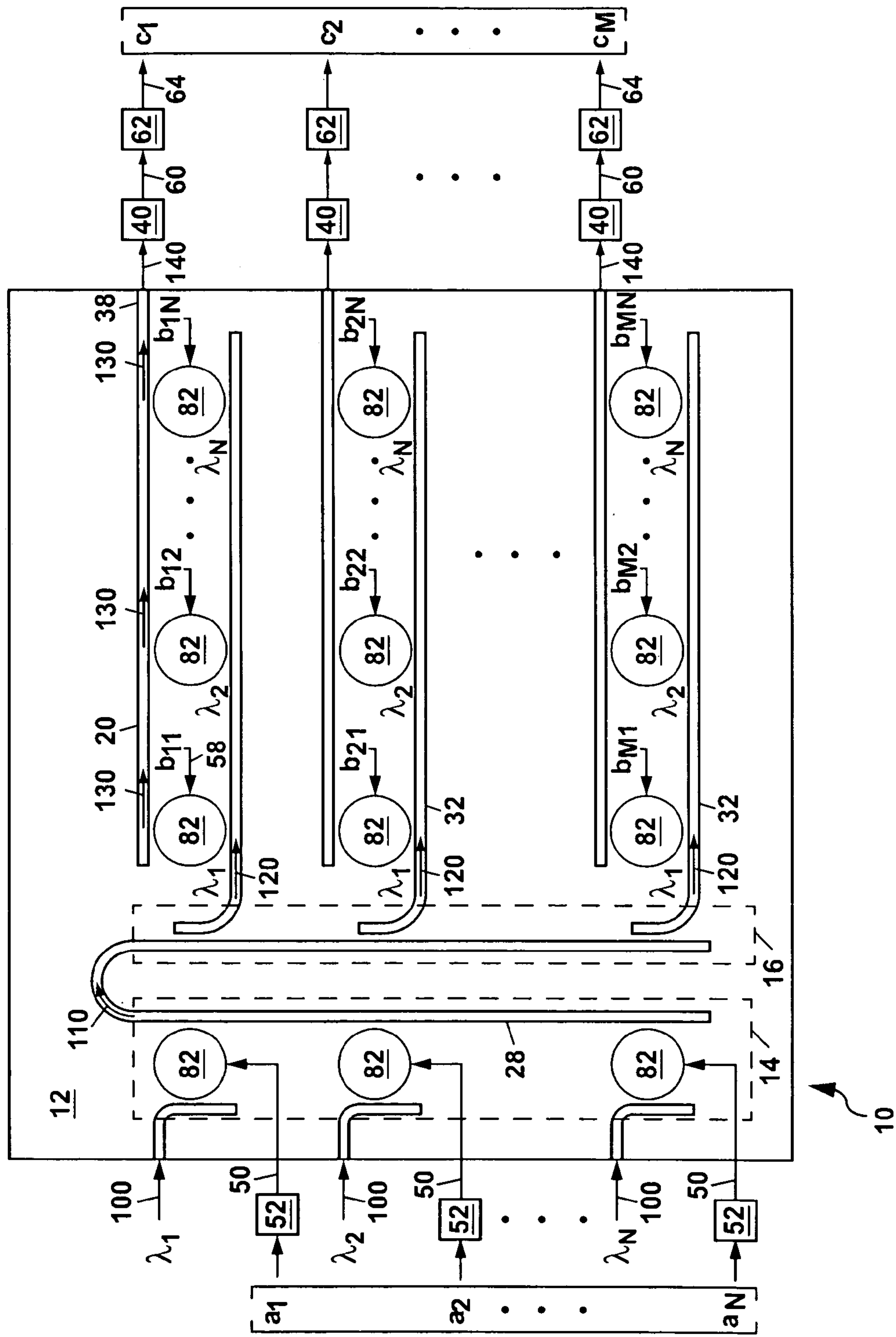
FIG. 8 shows a schematic plan view of a fourth example of the vector-matrix multiplier of the present invention.

FIG. 8 shows a schematic plan view of a fourth example of the vector-matrix multiplier 10 of the present invention. This example of the present invention is similar to the third example of the apparatus 10 in FIG. 4 except that a number N of ring resonator amplitude modulators 82 have been substituted for the N optical amplitude modulators 54 in the optical multiplexer 14, and another M×N ring resonator amplitude modulators 82 have been substituted for M×N optical amplitude modulators 54' in the device 10 of FIG. 4. Each ring resonator amplitude modulator 82 in the example of FIG. 8 functions as both an optical filter and an amplitude modulator (i.e. functions as a filter-modulator) to provide an amplitude modulation response which is substantially linear with an applied input signal. Thus, the apparatus 10 of FIG. 8 can be formed without the input filter 44 and output filter 46 used for the device 10 of FIG. 4.

The substantially linear amplitude modulation response of the ring resonator amplitude modulator 82 arises from a square root dependence of the carrier depletion in the modulator 82 with an applied reverse-bias voltage (i.e. the input signal 50 or 58) and a resultant shift in the resonant frequency of the modulator 82 which also has a square root dependence. This square-root dependence for the shift in the resonant frequency of the modulator 82 is balanced by an approximately quadratic transmission characteristic curve for the modulator 82 about the resonant frequency thereof to provide the substantially linear amplitude modulation response. A similar substantially linear amplitude modulation response occurs for the ring resonator amplitude modulator 82' of FIGS. 7A and 7B which can also be used to form the apparatus 10 of FIG. 8, or substituted for the waveguide amplitude modulators 48 in the examples of FIGS. 1, 3 and 4.

The ring resonator amplitude modulators 82 used in the example of FIG. 8 can simplify construction of the vector-matrix multiplier 10, and can also reduce an overall size of the device 10 since each ring resonator amplitude modulator 82 can be made as small as 4-6 μm in diameter. The ring resonator amplitude modulators 82 in FIG. 8 can be formed as previously described with reference to FIGS. 6A and 6B.

In the various examples of the vector-matrix multiplier 10 described herein, the input signals representing the vector A and matrix B can be provided electrical signals, or as optical signals, or as a combination of electrical and optical signals. For example, optical signals representing a matrix B can be received into a photodetector array (e.g. a focal plane array) and converted therein into electrical signals which can then be provided as input signals to the vector-matrix multiplier 10. This can be useful, for example, when the vector-matrix multiplier 10 is used to perform image correlation for facial recognition or for a synthetic aperture radar system. In these applications, the vector A can represent target information (e.g. from a terrorist watch list or from a map) which is input into the apparatus 10, and the matrix B can represent optical image data from a scene which is input into the focal plane array and therefrom to the apparatus 10 for correlation with the target information. The vector-matrix product C can then provide a correlation result between the target information and the image data from the scene to detect any change in the image data from the scene in real time, or to identify and track a moving target. Such a combination of a focal plane array with the vector-matrix multiplier 10 of the present invention is also useful to form an autonomous vehicle vision system. The focal plane array can be attached directly to the vector-matrix multiplier 10 using conventional integrated circuit (IC) packaging technology (e.g. with electrical connections between the focal plane array and the vector-matrix multiplier 10 being made using a plurality of solder bump bonds). In other embodiments of the present invention, the focal plane array can be formed on the same substrate 12 as the vector-matrix multiplier 10, or wafer-bonded thereto.

Those skilled in the art will understand that the apparatus 10 of the present invention can also be used to calculate Fourier transforms (e.g. discrete Fourier transforms and fast Fourier transforms), and also to perform correlation and convolution operations.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A vector-matrix multiplier for multiplying an N×1 vector and an M×N matrix to generate an M×1 vector-matrix product, comprising:

an optical multiplexer to receive a plurality of N different wavelengths of light corresponding to a number N of rows in the vector and to combine the plurality of N different wavelengths of light into an input wavelength-division-multiplexed (WDM) light stream, with each different wavelength of light being modulated with an amplitude which represents a row element $a_i$ of the vector with i=1, 2 . . . N;

an optical splitter to receive the input WDM light stream from the optical multiplexer and to split the input WDM light stream into a plurality of M light streamlets, with each light streamlet being guided out of the optical splitter into a transfer waveguide;

a plurality of M×N optical amplitude modulators arranged in M rows, with each row containing N of the optical amplitude modulators, and with each optical amplitude modulator in each of the M rows being coupled to one of the transfer waveguides to receive one of the N different wavelengths of light from the light streamlet in that transfer waveguide and to amplitude modulate that wavelength of light for a second time in response to an input signal which represents a column element $b_{ji}$ of the matrix which is provided to that optical amplitude modulator; and a plurality of M output waveguides, with each output waveguide being coupled to each optical amplitude modulator located in one of the M rows to receive each of the N different wavelengths of light from that row which have been amplitude-modulated for the second time and to form therefrom an output WDM light stream having an overall amplitude which represents a row element $c_j=\Sigma a_i b_{ji}$ of the M×1 vector-matrix product.

2. The apparatus of claim 1 further comprising a plurality of photodetectors, with each photodetector detecting the overall amplitude of one of the output WDM light streams to generate therefrom an output signal that represents one of the row elements $c_j$ of the M×1 vector-matrix product.

3. The apparatus of claim 2 wherein the output signal corresponding to each row element $c_j$ of the M×1 vector-matrix product is an analog output signal, and further comprising an analog-to-digital converter to convert the analog output signal into a digital output signal.

4. The apparatus of claim 3 wherein the row elements $a_i$ and the column elements $b_{ji}$ are both digital elements, and further comprising a plurality of digital-to-analog converters to convert the row elements $a_i$ and the column elements $b_{ji}$ into analog elements to provide an analog amplitude modulation for the plurality of N different wavelengths of light and for the plurality of M×N optical amplitude modulators.

5. The apparatus of claim 1 wherein each of the N different wavelengths of light is generated by a laser.

6. The apparatus of claim 5 wherein each laser is amplitude modulated by a modulation signal provided thereto to amplitude modulate the light generated by that laser to represent one of the row elements $a_i$ of the vector.

7. The apparatus of claim 1 herein the optical multiplexer comprises an input waveguide to receive each of the N different wavelengths of light, and an optical filter comprising at least one micro-ring resonator to filter each different wavelength of light.

8. The apparatus of claim 1 wherein the optical multiplexer comprises a plurality of N optical amplitude modulators to provide the amplitude modulation for each different wavelength of light representing one of the row elements $a_i$ of the vector.

9. The apparatus of claim 1 wherein each optical amplitude modulator in the plurality of M×N optical amplitude modulators comprises at least one micro-ring resonator.

10. The apparatus of claim 9 wherein each optical amplitude modulator in the plurality of M×N optical amplitude modulators comprises a waveguide amplitude modulator.

11. The apparatus of claim 1 wherein each optical amplitude modulator in the plurality of M×N optical amplitude modulators comprises a ring resonator amplitude modulator.

12. The apparatus of claim 1 wherein each optical amplitude modulator in the plurality of M×N optical amplitude modulators comprises a semiconductor junction.

13. The apparatus of claim 12 wherein the semiconductor junction within each optical amplitude modulator in the plurality of M×N optical amplitude modulators is a reverse-biased semiconductor junction.

14. A vector-matrix multiplier for multiplying an N×1 vector and an M×N matrix to generate an M×1 vector-matrix product, comprising:

a substrate;

a number (M+1)×N of micro-ring resonator filter-modulators formed on the substrate, with N of the micro-ring resonator filter-modulators each receiving a different wavelength of light and amplitude modulating the light at each different wavelength in response to a plurality of first input signals provided to the N micro-ring resonator filter-modulators, with each first input signal representing a row element $a_i$ of the vector with i=1, 2 . . . N, and with the remaining M×N micro-ring resonator filter-modulators amplitude modulating the light at each different wavelength for a second time in response to a plurality of second input signals provided the remaining M×N micro-ring resonator filter-modulators, with each second input signal representing a column element $b_{ji}$ of the matrix; and at least one output waveguide on the substrate to receive the light from the remaining M×N micro-ring resonator filter-modulators which has been amplitude modulated for the second time, with each output waveguide receiving the light from a set of the remaining M×N micro-ring resonator filter-modulators which has been modulated by the second input signals which represent the column elements $b_{ji}=b_{j1}, b_{j2} \ldots b_{jN}$ for a row j of the matrix so that an overall amplitude of the light in each output waveguide represents a row element $c_j=\Sigma a_i b_{ji}$ of the M×1 vector-matrix product.

15. The apparatus of claim 14 further comprising a photodetector to receive the light from each output waveguide and to generate therefrom an output signal to represent one of the row elements $c_j$ of the M×1 vector-matrix product.

16. The apparatus of claim 14 further comprising an optical multiplexer on the substrate formed, at least in part, from the N micro-ring resonator filter-modulators, with the optical multiplexer converting the different wavelengths of light into an input wavelength-division-multiplexed (WDM) light stream.

17. The apparatus of claim 14 wherein each of the (M+1)×N micro-ring resonator filter-modulators comprises at least one micro-ring resonator.

18. The apparatus of claim 17 wherein each micro-ring resonator has a diameter of less than or equal to 20 microns.

19. The apparatus of claim 17 wherein each micro-ring resonator comprises a monocrystalline silicon waveguide core.

20. The apparatus of claim 14 wherein each of the (M+1)×N micro-ring resonator filter-modulators comprises an amplitude modulator.

21. The apparatus of claim 20 wherein the amplitude modulator comprises a waveguide amplitude modulator.

22. The apparatus of claim 20 wherein the amplitude modulator comprises a ring resonator amplitude modulator.

23. The apparatus of claim 20 wherein the amplitude modulator comprises a semiconductor junction.

24. The apparatus of claim 23 wherein the semiconductor junction comprises a reverse-biased semiconductor junction.

25. The apparatus of claim 14 wherein the different wavelengths of light are spaced apart in frequency with a substantially-equal frequency spacing between each adjacent pair of the different wavelengths of light.

26. The apparatus of claim 14 wherein the different wavelengths of light are infrared wavelengths in a wavelength range of 1-2 microns.

27. The apparatus of claim 14 wherein each different wavelength of light is provided by a laser.

28. A vector-matrix multiplier for multiplying a vector and a matrix to generate a product of the vector and the matrix, comprising:

a substrate;

a plurality of lasers, with each laser providing light at a different wavelength;

a first plurality of optical amplitude modulators on the substrate, with each optical amplitude modulator of the first plurality of optical modulators receiving the light from one of the lasers and, in response to a first input signal representative of a row element $a_i$ of the vector with i=1, 2 . . . N, modulating an amplitude of the light to form a channel of amplitude-modulated light;

a bus waveguide on the substrate to receive each channel of amplitude-modulated light and to combine each channel of amplitude-modulated light to form a wavelength-division-multiplexed (WDM) light stream;

at least one transfer waveguide on the substrate and optically coupled to the bus waveguide, with each transfer waveguide receiving a portion of the WDM light stream from the bus waveguide;

a second plurality of optical amplitude modulators on the substrate proximate to each transfer waveguide, with each optical modulator of the second plurality of optical modulators coupling one of the channels of amplitude-modulated light out of the portion of the WDM light stream and amplitude modulating that channel of amplitude-modulated light in response to a second input signal representative of a column element $b_{ji}$ of the matrix, thereby forming a doubly-modulated light component;

at least one output waveguide on the substrate to receive the doubly-modulated light components from the optical modulators of each second plurality of optical modulators and to guide the doubly-modulated light components towards an output end of that output waveguide; and a photodetector located proximate to the output end of each output waveguide to detect the doubly-modulated light components from that output waveguide and to generate therefrom an output signal representative of a row element $c_j$ of the product of the vector and the matrix.

* * * * *